United States Patent
Sims

(10) Patent No.: US 7,274,840 B2
(45) Date of Patent: Sep. 25, 2007

(54) CLEAN AND TEST FOR FLUID WITHIN A REFLECTION OPTICAL SWITCH SYSTEM

(75) Inventor: Tyler Sims, Knoxville, TN (US)

(73) Assignee: Avago Technologies FIBER IP (Singapore) Pte. Ltd., Singapore (SG)

(*) Notice: Subject to any disclaimer, the term of this patent is extended or adjusted under 35 U.S.C. 154(b) by 111 days.

(21) Appl. No.: 10/625,818

(22) Filed: Jul. 23, 2003

(65) Prior Publication Data

US 2005/0018956 A1    Jan. 27, 2005

(51) Int. Cl.
*G02B 6/26* (2006.01)

(52) U.S. Cl. .................................. 385/18; 210/175

(58) Field of Classification Search .................. 385/18; 210/175, 181, 184, 185
See application file for complete search history.

(56) References Cited

U.S. PATENT DOCUMENTS

| | | | | |
|---|---|---|---|---|
| 3,926,832 A * | 12/1975 | Barosi | ..................... | 252/181.6 |
| 4,146,497 A * | 3/1979 | Barosi et al. | ............. | 252/181.6 |
| 4,988,157 A * | 1/1991 | Jackel et al. | ................. | 385/17 |
| 5,508,586 A * | 4/1996 | Martelli et al. | ............. | 313/560 |
| 5,699,462 A * | 12/1997 | Fouquet et al. | ................ | 385/18 |
| 5,852,689 A * | 12/1998 | Donald | ........................ | 385/21 |
| 6,165,328 A * | 12/2000 | Lorimer et al. | .......... | 204/192.1 |
| 6,195,478 B1 | 2/2001 | Fouquet | | |
| 6,320,994 B1 | 11/2001 | Donald et al. | | |
| 6,324,316 B1 | 11/2001 | Fouquet et al. | | |
| 6,327,397 B1 * | 12/2001 | Schiaffino et al. | ............ | 385/16 |
| 6,477,222 B1 * | 11/2002 | Nystrom et al. | ............... | 378/16 |
| 6,487,333 B2 * | 11/2002 | Fouquet et al. | ................ | 385/18 |
| 6,560,383 B1 * | 5/2003 | Nystrom | ....................... | 385/16 |
| 6,674,933 B2 * | 1/2004 | Troll | ............................. | 385/16 |
| 6,707,592 B1 * | 3/2004 | Schroeder et al. | .......... | 359/290 |
| 6,718,085 B1 * | 4/2004 | Scholz et al. | .................. | 385/17 |
| 6,765,161 B1 * | 7/2004 | Wong et al. | ................. | 200/182 |
| 6,798,939 B2 * | 9/2004 | Stawitcke et al. | ............ | 385/17 |
| 6,818,844 B2 * | 11/2004 | Wong et al. | ................. | 200/182 |
| 2003/0210848 A1 * | 11/2003 | Troll | ............................ | 385/16 |
| 2006/0243705 A1 * | 11/2006 | Sims | ....................... | 219/85.16 |

* cited by examiner

*Primary Examiner*—Ellen E. Kim

(57) ABSTRACT

Fluid within a reflection optical switch system is purified. Gettering structures are placed within a chamber within the reflection optical switch system. The gettering structures includes heating components which when actuated attract impurities. The heating components within the gettering structures are turned on to getter out impurities from fluid within the chamber.

11 Claims, 9 Drawing Sheets

10# CLEAN AND TEST FOR FLUID WITHIN A REFLECTION OPTICAL SWITCH SYSTEM

BACKGROUND

The present invention concerns fluid systems and pertains particularly to clean and test for fluid within a reflection optical switch system.

Optical fibers provide significantly higher data rates than electronic paths. However, effective utilization of the greater bandwidth inherent in optical signal paths requires optical cross-connect switches.

One type of optical cross-connect utilizes total internal reflection (TIR) switching elements. A TIR element consists of a waveguide with a switchable boundary. Light strikes the boundary at an angle. In the first state, the boundary separates two regions having substantially different indices of refraction. In this state the light is reflected off of the boundary and thus changes direction. In the second state, the two regions separated by the boundary have the same index of refraction and the light continues in a straight line through the boundary. The magnitude of the change of direction depends on the difference in the index of refraction of the two regions. To obtain a large change in direction, the region behind the boundary must be switchable between an index of refraction equal to that of the waveguide and an index of refraction that differs markedly from that of the waveguide.

One type of TIR element is taught in U.S. Pat. No. 5,699,462 which is hereby incorporated by reference. The TIR taught in this patent utilizes thermal activation to displace liquid from a gap at the intersection of a first optical waveguide and a second optical waveguide. In this type of TIR, a trench is cut through a waveguide. The trench is filled with an index-matching liquid. A bubble is generated at the cross-point by heating the index matching liquid with a localized heater. The bubble must be removed from the crosspoint to switch the cross-point from the reflecting to the transmitting state and thus change the direction of the output optical signal. Purity of the liquid and near absolute cleanliness within the assembled package is necessary for optimal performance and longevity of the TIR elements.

SUMMARY OF THE INVENTION

In accordance with the preferred embodiment, fluid within a reflection optical switch system is purified. Gettering structures are placed within a chamber within the reflection optical switch system. The gettering structures include heating components which when actuated attract impurities. The heating components within the gettering structures are turned on to getter out impurities from the fluid within the chamber.

DESCRIPTION OF THE PREFERRED EMBODIMENT

Figure 1:
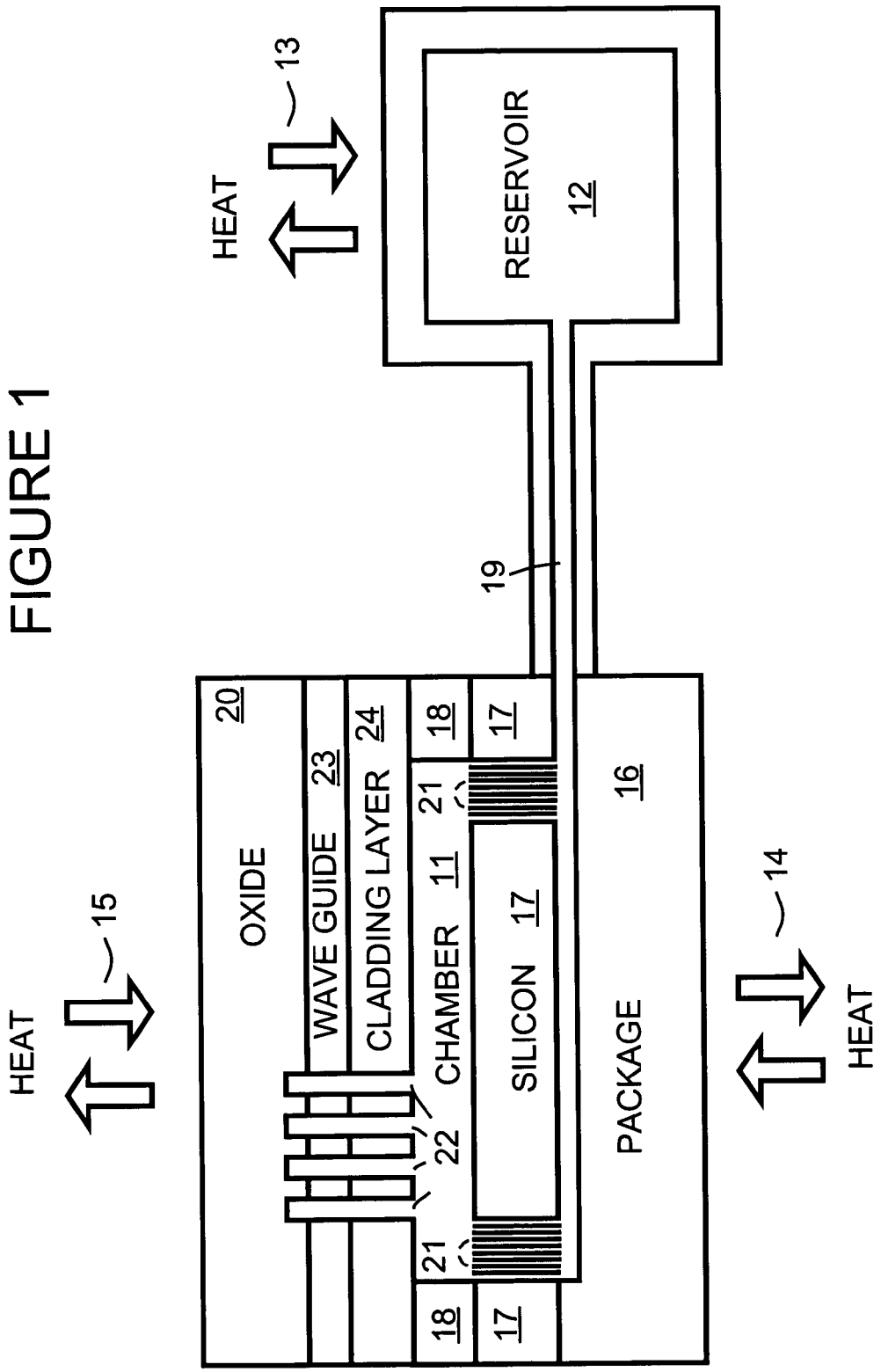
FIG. 1 is a simplified illustration of an optical switch system in accordance with a preferred embodiment of the present invention.

FIG. 1 is a simplified cross section of an optical switch system, not to scale. On package 16 is connected a silicon wafer 17. For example package 16 is composed of molybdenum, silicon or some other material. A cap 20 a waveguide 23 and a cladding layer 24 are attached to package 16 via solder areas 18. Cap 20 is composed of, for example, oxide or quartz. Trenches 22 are representative of one or thousands of trenches used for optical switching. The trenches penetrate through cladding layer 24 through waveguide area 23 and into cap 20.

A reservoir 12 stores liquid used for optical switching. Fluid is transferred through a conduit 19 to a chamber 11. The fluid enters chamber 11 through filaments 21 in silicon wafer 17. There may be hundreds or thousands of filaments placed as needed throughout silicon wafer 17.

Fluid in the form of vapor and liquid is transported, with the use of heat, between reservoir 12, chamber 11 and trenches 22 used for optical switching. Arrows 13, arrows 14 and arrows 15 represent the application and removal of heat at various locations to facilitate transport of fluid in the system.

Heat is added to reservoir 12 so that vapor will be transported from reservoir 12 through conduit 19 to chamber 11. After the vapor enters chamber 11 through the filaments, the vapor begins to condense. Various structures within chamber 11 are used to achieve gettering of impurities in the system.

Figure 2:
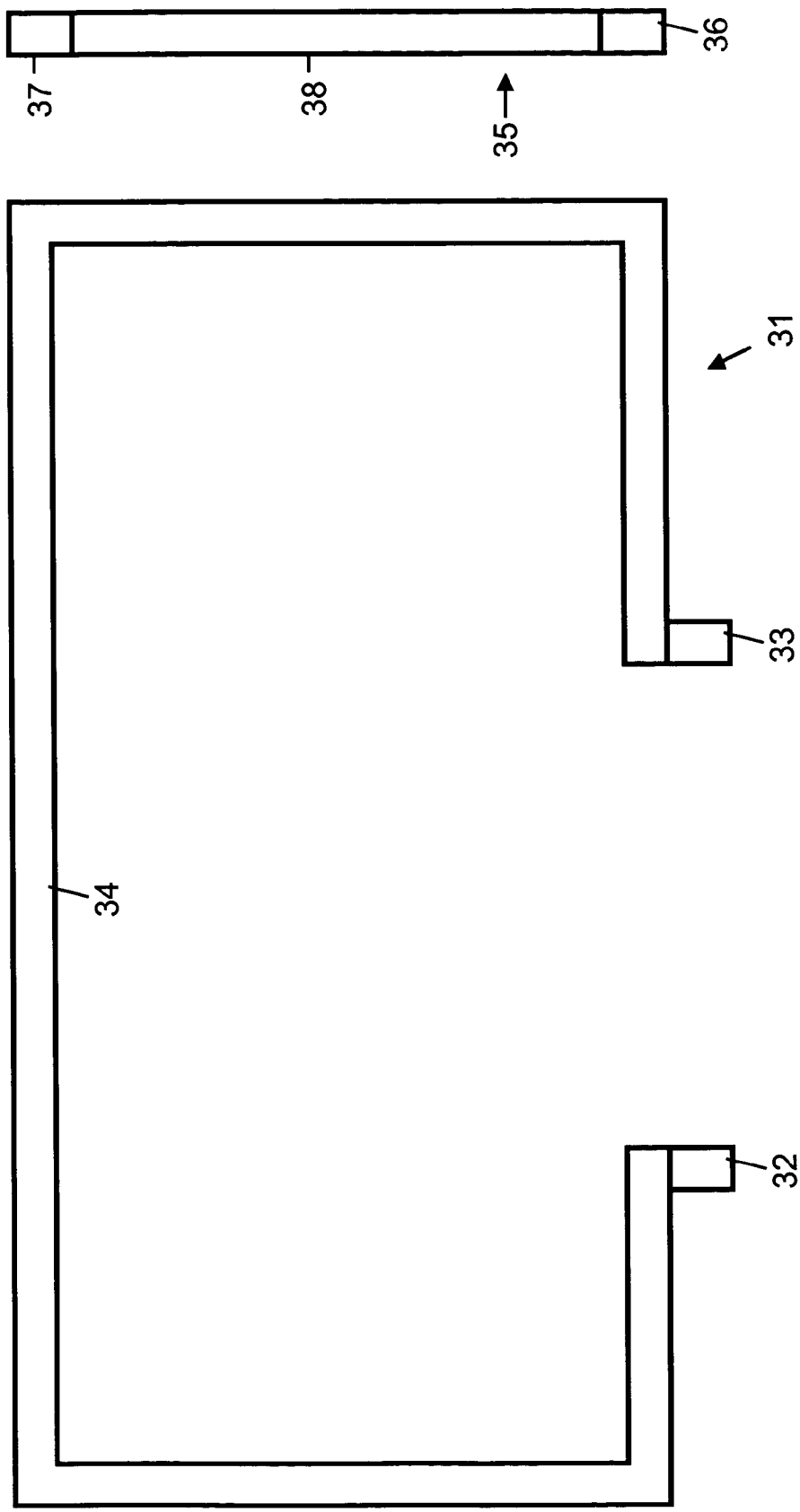
FIG. 2 shows sample heating structures used to heat and purify liquid within the optical switch system shown in FIG. 1 in accordance with a preferred embodiment of the present invention.

FIG. 2 shows sample heating structures used to heat and thus getter impurities. Structure 31 and structure 35 are essentially long resistors that function as heaters. Structure 31 is a frame composed of resistive material 34 placed between an electrode 32 and an electrode 33. For example, resistive material 34 is composed of aluminum (Al), tantalum aluminum (TaAl), platinum (Pt), tungsten (W) or molybdenum (Mo) or other materials. Likewise, structure 35 is a resistive element composed of, for example, doped single crystal silicon material 38 placed between an electrode 36 and an electrode 37.

Structures such as structure 31 and structure 35 can be placed, for example, below or otherwise close to solder areas 18. Structures such as structure 31 and structure 35 are used to warm liquid within chamber 11 and to burn out the liquid and contaminants. Structures such as structure 31 and structure 35 can also be used to assist in the solder process when forming solder areas 18.

Figure 3:
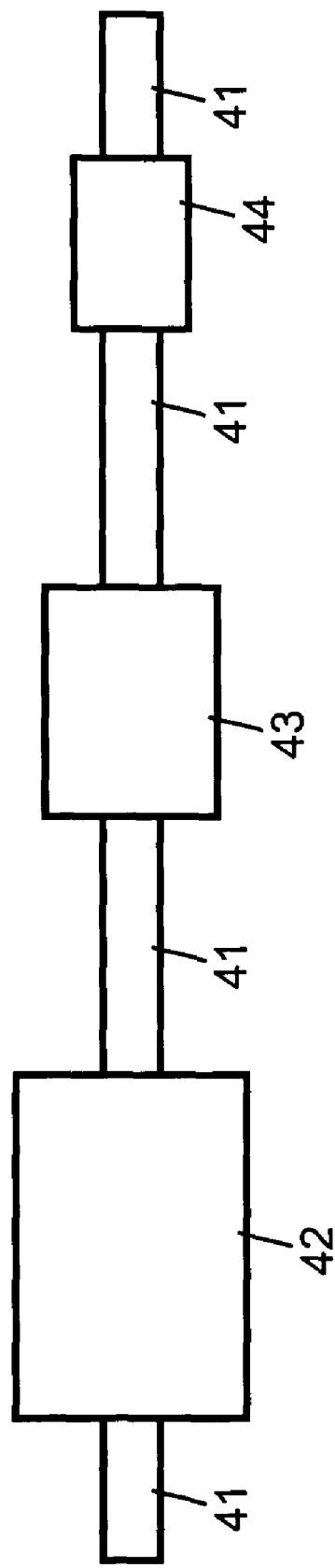
FIG. 3 shows coupon structures of various sizes used to test the purity of liquid within the optical switch system shown in FIG. 1 in accordance with a preferred embodiment of the present invention.

FIG. 3 shows coupon structures of various sizes used to test the purity of liquid within the optical switch system shown in FIG. 1. Shown in FIG. 3 is a coupon structure 42, a coupon structure 43 and a coupon structure 44. Coupon structures 42 through 44 are representative of thousands of coupon structures of different sizes, different coating materials and different surface roughness, etc. used within chamber 11 (shown in FIG. 1). Example materials out which the coupon structures are composed include Pt, Chrome, Ti, Ta, W, Si or gold (Au). The materials are placed over resistors which, when actuated, heat the coupon structures and cause targeted impurities to adhere to the surface. Strategic selection of material, size, placement and activation of coupon structures allows detection, determination of concentration levels and other analysis of contaminants present within chamber 11.

In FIG. 3, coupon structures 42 through 44 are shown connected serially with increasing or decreasing sizes. Alternatively, for example, coupon structures can be connected in parallel or in some combination of serial and parallel with increasing, decreasing or otherwise mixed sizes for the coupon structures.

For example, coupon structures are placed on the surface of silicon wafer 17 shown in FIG. 1. Oxide 20 is formed so as to be transparent and allow optical access to the coupon structures for Raman analysis. If destructive analysis is used, the coupon structures are designed with sufficient area to allow for spectroscopy techniques such as Time of Flight Secondary Ion mass spectrometry (TOF-SIMS), X-ray Photoelectron Spectroscopy (XPS) analysis or Rutherford Back Scattering (RBS) analysis.

Figure 4:
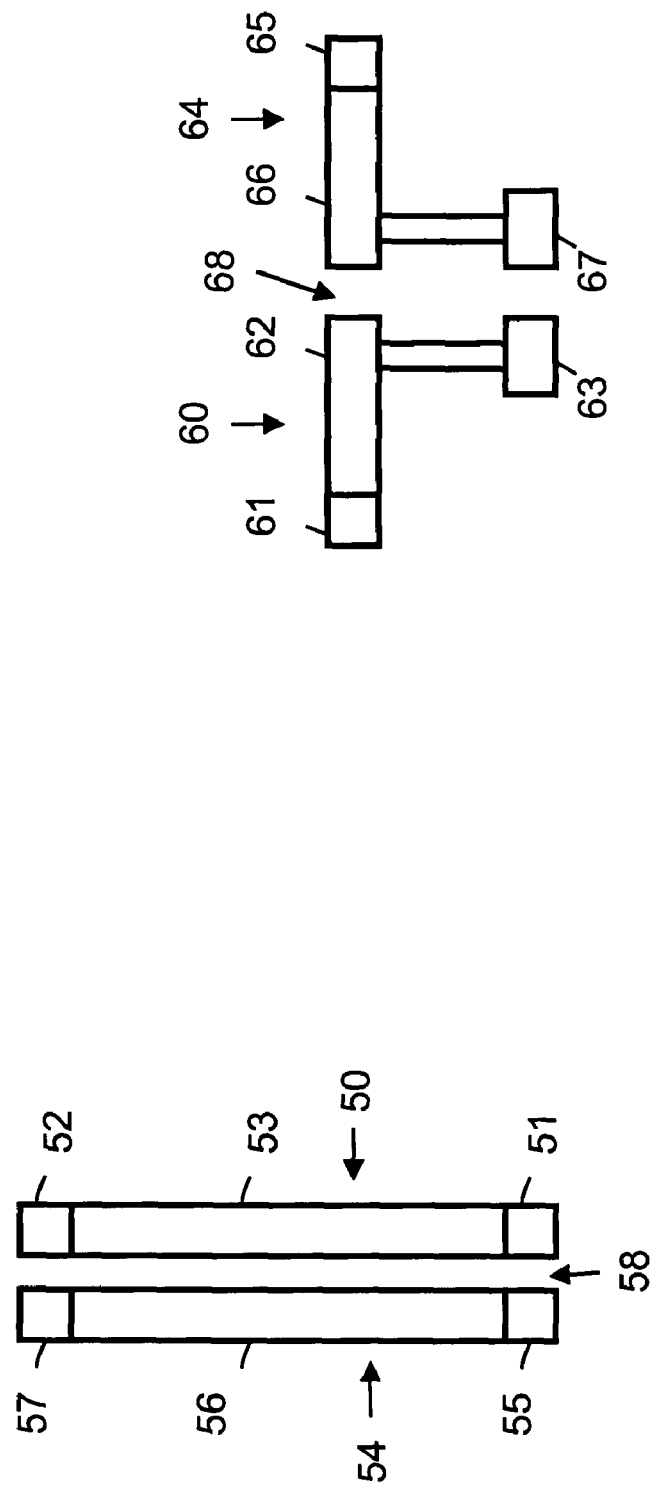
FIG. 4 shows biasing structures used to purify liquid within the optical switch system shown in FIG. 1 in accordance with a preferred embodiment of the present invention.

FIG. 4 shows structures designed to be turned on periodically to monitor change in impurity levels during operation of the optical switch system shown in FIG. 1. Shown in FIG. 4 are a conductor 50 and a conductor 54 in parallel. Conductor 50 consists of conductive material 53 between an electrode 51 and an electrode 52. Conductive material 53 is formed of, for example, Mo, W, or Ta. These materials have high melting points and a relatively long life for electrical and oxidation stresses. Conductor 54 consists of conductive material 56 between an electrode 55 and an electrode 57. Conductive material 56 is formed of, for example, Mo, W, or Ta, rhenium (Re), rhodium (Rh), iridium (Ir), Pt and other alloys thereof. A gap 58 between conductor 50 and conductor 54 can vary, for example from 2 to 50 micrometers. For example, when activated, voltage across conductor 50 and conductor 54 can be stepped up in ultra high precision voltage increments noting fAmp and pVolt conductivity changes. The resulting current drawn can be measured by rheotstats, bridge networks or an inline current limiting resistor. Each of these field effect devices can be coated with different dielectrics to prevent hards, shorts and to aid in creating enhanced chemical and surface physics reactions. Examples of these coatings include carbon, Teos, Si3N4, SiC, SiO2, Al2O3, pyrolyne, polyimides, Teflon, SrTaO3.

Also shown in FIG. 4 are a conductor 60 and a conductor 64 in parallel. Conductor 60 consists of conductive material 62, an electrode 61 and an electrode 63. Conductive material 63 is formed of, for example, Mo, W, or Ta, Re, Rh, Ir, Pt and other alloys thereof. Conductor 64 consists of conductive material 66, an electrode 65 and an electrode 67. Conductive material 66 is formed of, for example, Mo, W, or Ta, Re, Rh, Ir, Pt and other alloys thereof. A gap 68 between conductor 60 and conductor 64 can vary, for example from 2 to 50 micrometers. For example, when activated, voltage across conductor 60 and conductor 64 can be stepped up in ultra high precision voltage increments noting fAmp and pVolt conductivity changes.

Figure 5:
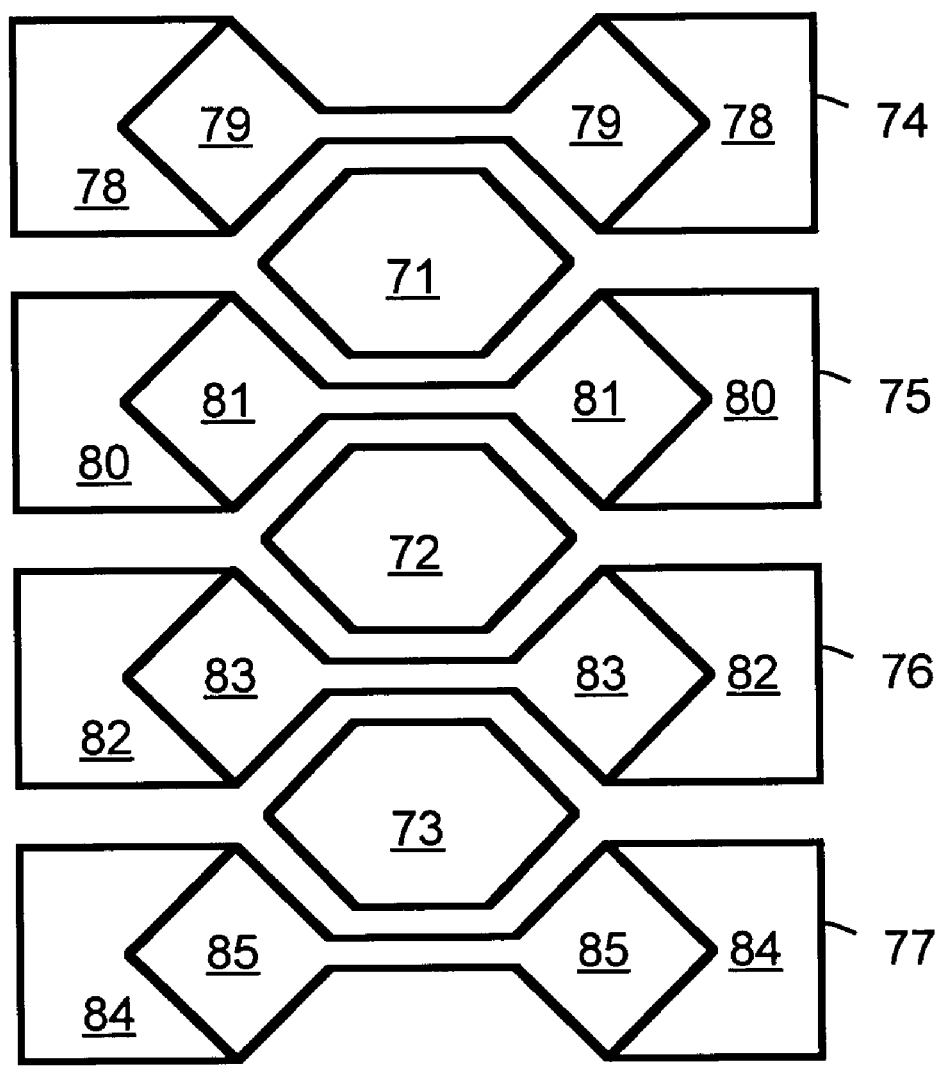
FIG. 5 shows the positioning of heating structures placed around filaments and used to purify liquid within the optical switch system shown in FIG. 1 in accordance with a preferred embodiment of the present invention.

FIG. 5 shows the positioning of heating structures placed around the filaments represented in FIG. 1 by dashes 21. As shown in FIG. 5, a filament hole 71, a filament hole 72 and a filament hole 73 are surrounded by a heating element 74, a heating element 75, a heating element 76 and a heating element 77. Filament holes 71 through 73 and heating elements 74 through 77 are merely representative, because, as noted above, there may be hundreds or thousands of filaments positioned as needed throughout silicon wafer 17.

Heating element 74 consists of resistive material 79 placed over and between electrodes 78. Heating element 75 consists of resistive material 80 placed over and between electrodes 81. Heating element 76 consists of resistive material 83 placed over and between electrodes 82. Heating element 77 consists of resistive material 85 placed over and between electrodes 84. For example, resistive materials 79, 81, 83 and 85 include a layer of Platinum (Pt) placed over a layer of titanium (Ti). Alternatively, resistive materials 79, 81, 83 and 85 include a layer of (Platinum) placed between two layers of titanium (Ti). Ti/Pt coated resistors are designed to getter hydrocarbons. Ti/Pt/Ti coated resistors are designed to getter oxygen and water vapor. Straight or optional resistor shapes can be used instead of the bow tie shapes. While shown with an octagon shape, filament holes 71 through 73 can be different shapes.

Figure 6:
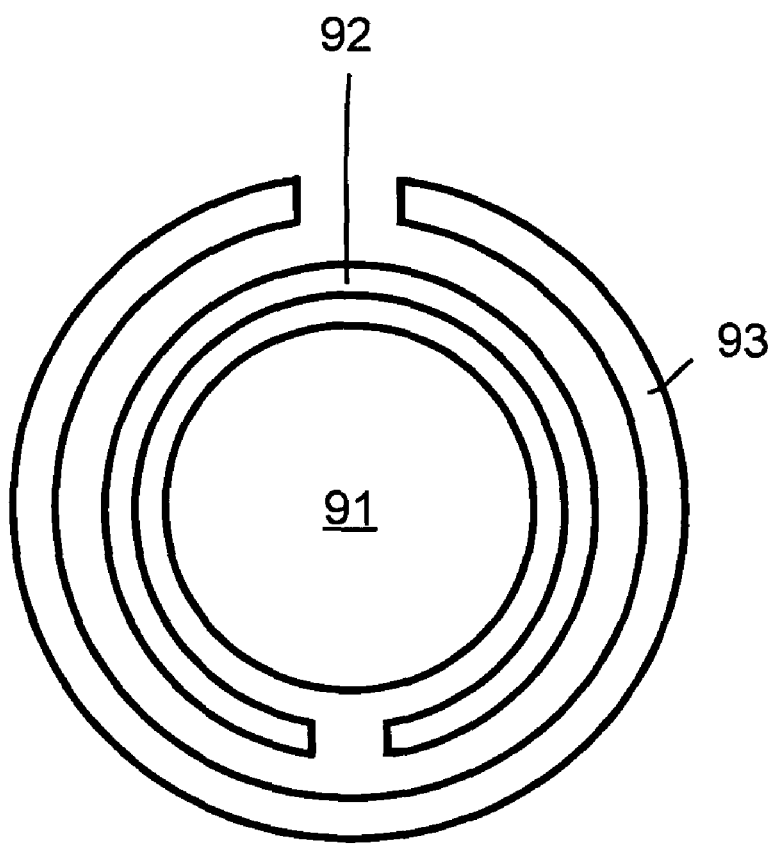
FIG. 6 shows the positioning of heating structures placed around filaments and used to purify liquid within the optical switch system shown in FIG. 1 in accordance with another preferred embodiment of the present invention.

FIG. 6 shows an alternative embodiment of heating structures surrounding a filament hole. A filament hole 91 is surrounded by a heating element 92 and a heating element 93. For example, heating element 92 consists of resistive material composed of a layer of Pt placed over a layer of Ti. For example, heating element 93 consists of resistive material composed of a layer of Pt placed between two layers of Ti. Ti/Pt resistors are designed to getter hydrocarbons. Ti/Pt/Ti covered resistors are designed to getter oxygen and water vapor.

Figure 7:
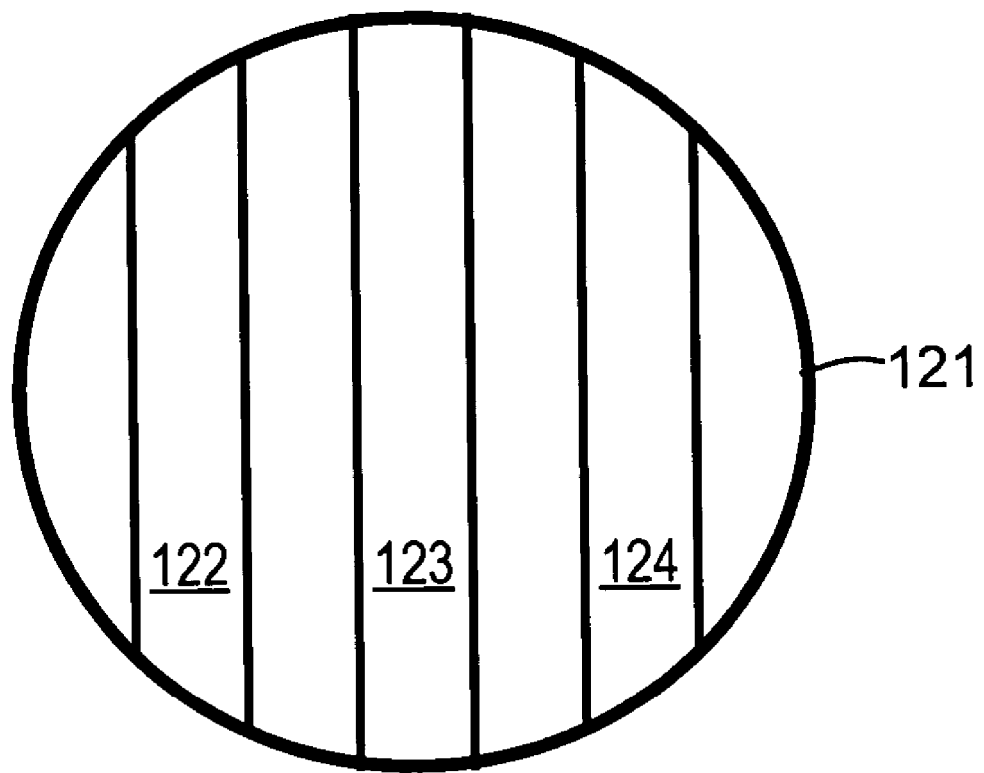
FIG. 7 show pillars of silicon suspending resistors within a filament in accordance with another preferred embodiment of the present invention.

FIG. 7 illustrates suspended pillars of silicon suspending resistors within filaments, such as filaments 21 shown in FIG. 1. Looking down through a filament hole 121 are seen a silicon pillar 122, a silicon pillar 123 and a silicon pillar 124. Each of silicon pillars 122 through 124 is used to suspend a resistor within the filament hole 121. For example, each of silicon pillars 122 through 124 is covered with a layer of Pt placed over a layer of Ti or is covered with a layer of Pt placed between two layers of Ti. Ti/Pt resistors are designed to getter hydrocarbons. Ti/Pt/Ti covered resistors are designed to getter oxygen and water vapor.

Figure 8:
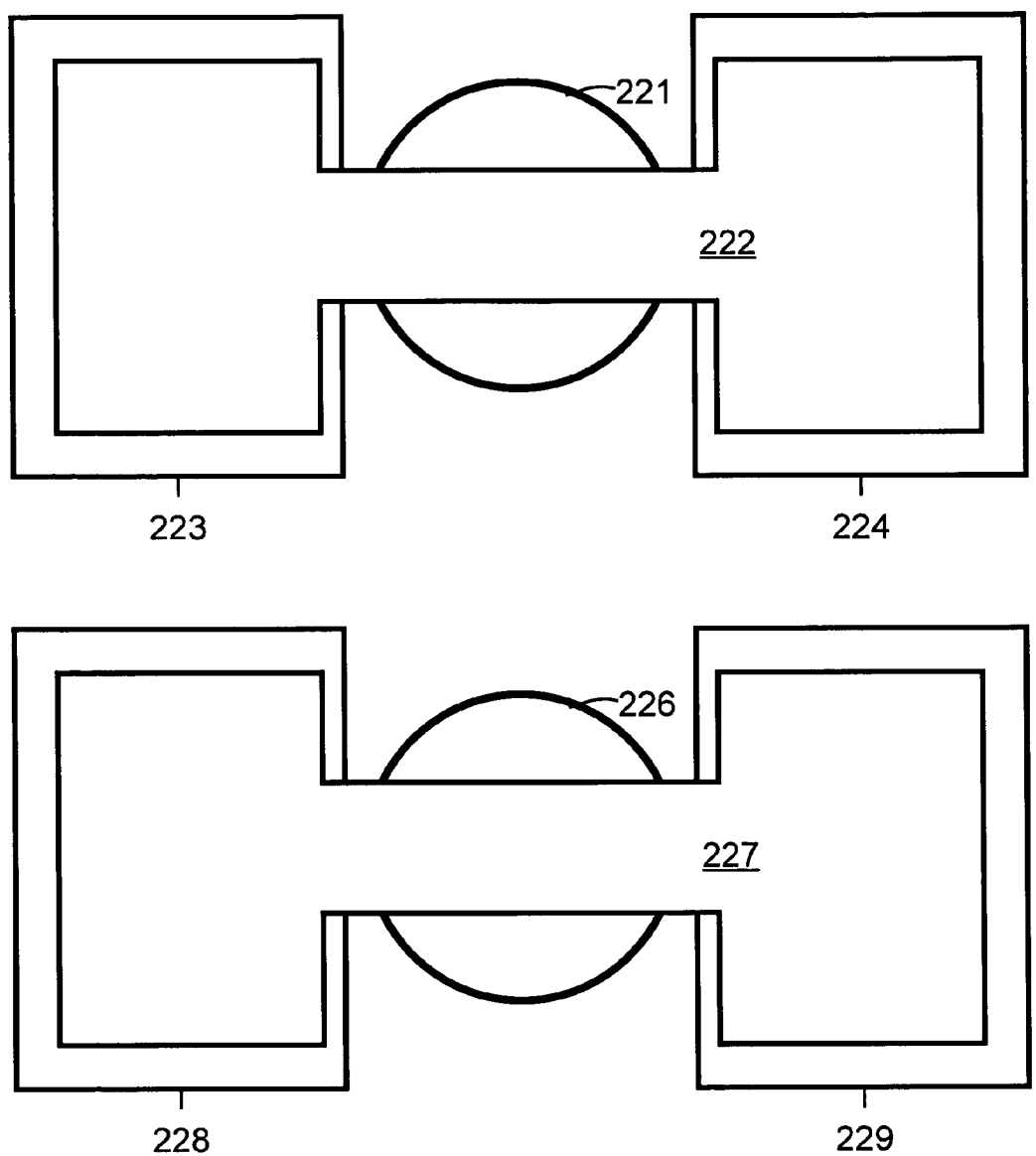
FIG. 8 and FIG. 9 show a bridge structure suspended over a filament hole in accordance with another preferred embodiment of the present invention.

FIG. 8 shows a bridge 222 suspended over a filament hole 221. For example, bridge 222 is composed of silicon covered with a layer of Pt placed over a layer of Ti or covered with a layer of Pt placed between two layers of Ti. Ti/Pt resistors are designed to getter hydrocarbons. Ti/Pt/Ti covered resistors are designed to getter oxygen and water vapor. Bridge 222 is placed on an electrode 223 and an electrode 224 on the surface of a substrate.

FIG. 8 also shows a bridge 227 suspended over a filament hole 226. For example, bridge 226 is composed of silicon covered with a layer of Pt placed over a layer of Ti or covered with a layer of Pt placed between two layers of Ti. Ti/Pt resistors are designed to getter hydrocarbons. Ti/Pt/Ti covered resistors are designed to getter oxygen and water vapor. Bridge 227 is placed on an electrode 228 and an electrode 228 on the surface of a substrate.

Bridge 222 and bridge 227 are illustrative of bridges that may be placed through chamber 11 (shown in FIG. 1). The bridges can be placed over filament holes and also at locations where there are not filament holes.

Figure 9:
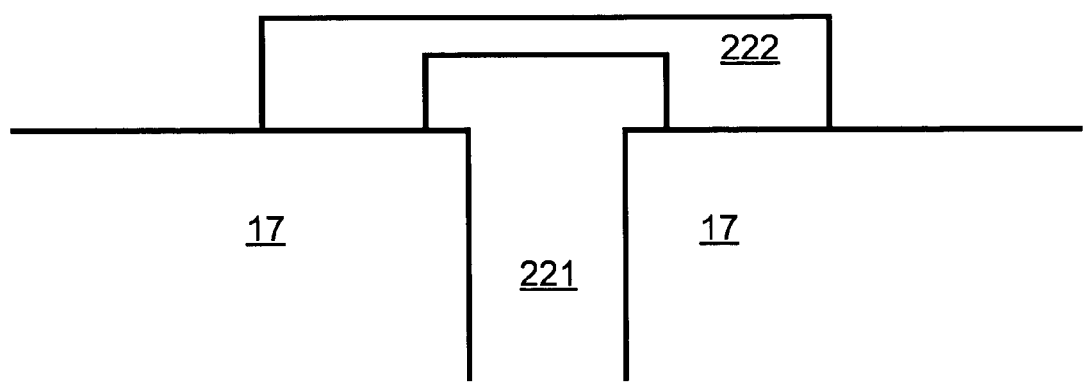

FIG. 9 is a side view of bridge 222. For example, bridge 222 is placed on a silicon substrate 17 through which filament hole 221 has been formed.

For example, the various structures described above are used for gettering and testing as follows. When transporting vapor into chamber 11 shown in FIG. 1, maximum temperature is maintained within the chamber and available heating and gettering structures such as structure 31 and structure 35 shown in FIG. 2 are turned on. Also turned on are heaters around filament holes such as heating elements 74 through 77 shown in FIG. 5 and/or heating elements 92 and 93 shown in FIG. 6.

Once liquid condenses within chamber 11, testing structures such as coupon structures 42 through 43 are turned on and deposits monitored. This is done, for example, until no further deposits are being made or oxide growth occurs at rates outside of the formulated and preferred levels. For example, Raman analysis is used to optically evaluate test structures placed, for example on silicon wafer 17 (shown in FIG. 1) by optically accessing the testing structures through the package to determine the contamination level and composition. Destructive analysis such as XPS, TOF-SIMS and RBS analysis can also be used.

Once initial cleaning of the device has been performed and initial testing has been passed, test structures such as those formed by conductors 50 and 54, and conductors 60 and 64 can be used for periodic monitoring. For example, periodic monitoring is performed to detect any change over time in the impurity level of fluid in chamber 11. If, during the performance of periodic monitoring, deposits are detected, bubbles form at too low of voltage, or bubbles persist after voltage is removed, the initial cleaning and testing can be performed again.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for purifying a fluid within a reflection optical switch system, comprising:
   placing gettering structures within a chamber within the reflection optical switch system, wherein placing gettering structures includes placing heating components around filament holes through which vapor enters the chamber from a reservoir, the heating components attracting impurities from the fluid when the heating components are actuated; and
   actuating the heating components to getter out impurities from fluid.

2. A method for in a fluid within a reflection optical switch system, comprising:
   placing gettering structures within a chamber within the reflection optical switch system, wherein placing gettering structures includes placing heating components on pillars within filament holes through which vapor enters the chamber from a reservoir, the heating components attracting impurities from the fluid when the heating components are actuated; and
   actuating the heating components to getter out impurities from the fluid.

3. A method for purifying a fluid within a reflection optical switch system, comprising:
   placing gettering structures within a chamber within the reflection optical switch system, wherein placing gettering structures includes placing a plurality of rectangular-shaped structures, the plurality of rectangular-shaped structures including rectangular-shaped structures of different sizes and composed of different materials so as to target different materials for gettering, the rectangular-shaped structures attracting impurities from the fluid when the rectangular-shaped structures are actuated; and
   actuating the rectangular-shaped structures to getter out impurities from the fluid.

4. The method of claim 3, wherein at least some of the gettering structures are optically accessible from outside of the chamber.

5. A method for purifying a fluid within a reflection optical switch system, comprising:
   placing gettering structures within a chamber within the reflection optical switch system, wherein placing gettering structures includes placing structures separated by a gap of predetermined size, the structures being used to generate a voltage differential across the gap, the structures attracting impurities from the fluid when the structures are actuated;
   actuating the structures; and
   taking electrical measurements from the structures to monitor impurity levels of the system.

6. A reflection optical switch system, comprising:
   a chamber that stores a fluid; and
   gettering structures within the chamber, wherein the gettering structures include heating components placed around filament holes through which vapor enters the chamber from a reservoir, the heating components absorbing impurities from the fluid when the heating components are actuated.

7. A reflection optical switch system, comprising:
   a chamber that stores a fluid; and
   gettering structures within the chamber, wherein the gettering structures include heating components placed on pillars within filament holes through which vapor enters the chamber from a reservoir, the heating components absorbing impurities from the fluid when the heating components are actuated.

8. A reflection optical switch system, comprising:
   a chamber that stores a fluid; and
   gettering structures within the chamber, wherein the gettering structures include a plurality of rectangular-shaped structures, the plurality of rectangular-shaped structures including rectangular-shaped structures of different sizes and composed of different materials so as to target different materials for gettering, the rectangular-shaped structures absorbing impurities from the fluid when the rectangular-shaped structures are actuated.

9. A reflection optical switch system as in claim 8, wherein at least some of the gettering structures are optically accessible from outside the chamber.

10. A reflection optical switch system, comprising:
    a chamber that stores a fluid;
    gettering structures within the chamber, wherein the gettering structures include structures separated by a gap of predetermined size, the structures being used to generate a voltage differential across the gap, the structures attracting impurities from the fluid when the structures are actuated; and
    a measurement device coupled to the gettering structures for taking electrical measurements from the structures to monitor impurity levels of the system.

11. A reflection optical switch system, comprising:
    a chamber that stores a fluid; and
    gettering structures within the chamber, the gettering structures including heating components that absorb impurities from the fluid when the heating components are activated, wherein the gettering structures include bridge structures placed over filament holes through which the fluid enters the chamber.

* * * * *

UNITED STATES PATENT AND TRADEMARK OFFICE
CERTIFICATE OF CORRECTION

PATENT NO.         : 7,274,840 B2                                     Page 1 of 1
APPLICATION NO.    : 10/625818
DATED              : September 25, 2007
INVENTOR(S)        : Tyler Sims It is certified that error appears in the above-identified patent and that said Letters Patent is hereby corrected as shown below:

Col. 5 Line 46 In Claim 2, delete "in" and insert -- purifying --, therefor.

Signed and Sealed this

Seventeenth Day of March, 2009

JOHN DOLL
*Acting Director of the United States Patent and Trademark Office*